(12) United States Patent
Noguchi et al.

(10) Patent No.: US 8,818,388 B2
(45) Date of Patent: *Aug. 26, 2014

(54) COMMUNICATION DEVICE, COMMUNICATION SYSTEM, AND RESTRICTING METHOD

(71) Applicant: NTT Docomo, Inc., Chiyoda-ku (JP)

(72) Inventors: Katsuhiro Noguchi, Kanagawa (JP); Shinpei Kawakatsu, Kanagawa (JP)

(73) Assignee: NTT Docomo, Inc., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/916,106

(22) Filed: Jun. 12, 2013

(65) Prior Publication Data

US 2013/0281011 A1 Oct. 24, 2013

Related U.S. Application Data

(63) Continuation of application No. 12/602,165, filed as application No. PCT/JP2008/059940 on May 29, 2008, now Pat. No. 8,494,536.

(30) Foreign Application Priority Data

May 31, 2007 (JP) ................................ 2007-145994

(51) Int. Cl.
 *H04W 72/00* (2009.01)
 *H04W 12/00* (2009.01)
(52) U.S. Cl.
 USPC ............................ 455/450; 455/418; 455/419
(58) Field of Classification Search
 None
 See application file for complete search history.

(56) References Cited

U.S. PATENT DOCUMENTS

| 2005/0027830 | A1 | 2/2005 | Florkey et al. |
| 2005/0164687 | A1 | 7/2005 | DiFazio |
| 2006/0223519 | A1 | 10/2006 | Yahagi |

FOREIGN PATENT DOCUMENTS

| CN | 1878365 A | 12/2006 |
| CN | 1946204 A | 4/2007 |
| JP | 10 276475 | 10/1998 |
| JP | 2001 078260 | 3/2001 |
| JP | 2003 61141 | 2/2003 |
| JP | 2006 115178 | 4/2006 |
| JP | 2006 186686 | 7/2006 |
| JP | 2006 287445 | 10/2006 |
| WO | WO 2005/055498 A2 | 6/2005 |
| WO | WO 2005/055498 A3 | 6/2005 |

OTHER PUBLICATIONS

Supplementary European Search Report issued on Sep. 8, 2010, in EP Patent Application EP 08 77 7002.
Office Action issued Sep. 29, 2011, in Chinese Patent Application No. 200880017576.1 with English translation.

*Primary Examiner* — Erika A Washington
(74) *Attorney, Agent, or Firm* — Oblon, Spivak, McClelland, Maier & Neustadt, L.L.P.

(57) ABSTRACT

An object is to provide a communication device, a communication system, and a restricting method permitting a communication restriction for each service class. A user equipment 100 has a memory unit 102 which stores service class information showing correspondence between service classes indicative of available communication services, and service class codes to discriminate the service classes. A notice information transmitting unit 101 then receives a restriction message indicative of a service class number from an RNC 200. When the restriction message including the service class number is received, a restricting unit 104 specifies a service class corresponding to the service class number stored in the memory unit 102 and implements a communication restriction in the service class on a communication processing unit 105.

3 Claims, 19 Drawing Sheets

Fig.3

| Service Class Information Version | | Version#1(e.g.MCC&MNC&Unique Number) | | | | |
|---|---|---|---|---|---|---|
| | Service Class Number | #0 | #1 | #2 | #3 | #4 | null |
| Service Class | | All are barred | ·PS&APN#1 (i.e. mail), ·PS&APN#2 (i.e. WEB browsing), and ·PS&APN#3 (i.e. push talk) | ·CS&TS11 (i.e. voice) and ·CS&BS30 (i.e. videophone) | none | none | None is barred |
| Control Signal Class | | All are barred | none | none | ·Session Management Message | ·Mobility Management Message | None is barred |

Fig.6

(a) 50% Restriction on mail/WEB browsing/push talk

| UE Class Number | #0 | #1 | #2 | #3 | #4 | #5 | #6 | #7 | #8 | #9 |
|---|---|---|---|---|---|---|---|---|---|---|
| Service Class Number | null | #1 | null | #1 | null | #1 | null | #1 | null | #1 |

(b) 80% Restriction on location registration signal

| UE Class Number | #0 | #1 | #2 | #3 | #4 | #5 | #6 | #7 | #8 | #9 |
|---|---|---|---|---|---|---|---|---|---|---|
| Service Class Number | null | #4 | #4 | #4 | #4 | null | #4 | #4 | #4 | #4 |

Fig.13

| Service Class Information Version | Version#1 (e.g.MCC+MNC+"PS"+#1) | | | | | |
|---|---|---|---|---|---|---|
| Service Class Number | #0 | #1 | #2 | #3 | #4 | null |
| Service Class | All are barred | ·PS&APN#1 (i.e. mail) | ·PS&APN#2 (i.e. WEB browsing), and ·PS&APN#3 (i.e. push talk) | none | none | None is barred |
| Control Signal Class | All are barred | none | none | ·Session Management Message | ·Mobility Management Message | None is barred |

| Service Class Information Version | Version#1 (e.g.MCC+MNC+"CS"+#1) | | | | | |
|---|---|---|---|---|---|---|
| | Service Class Number | #0 | #1 | #2 | #3 | #4 | null |
| Service Class | | All are barred | •CS&TS11 (i.e. voice) and | •CS&BS30 (i.e. videophone) | none | none | None is barred |
| Control Signal Class | | All are barred | none | none | •Call Control Message | •Mobility Management Message | None is barred |

US 8,818,388 B2

COMMUNICATION DEVICE, COMMUNICATION SYSTEM, AND RESTRICTING METHOD

CROSS-REFERENCE TO RELATED APPLICATIONS

This application is a continuation of U.S. application Ser. No. 12/602,165 filed Mar. 10, 2010, is now U.S. Pat. No. 8,494,536, the entire contents of which are incorporated by reference. U.S. application Ser. No. 12/602,165 is a National Stage of PCT/JP08/059,940 filed May 29, 2008, and claims the benefit of priority under 37 U.S.C. §119 of Japanese Application No. 2007-145994 filed May 31, 2007.

TECHNICAL FIELD

The present invention relates to a communication device, a communication system, and a restricting method for implementing a communication restriction.

BACKGROUND ART

A communication restriction is imposed during network congestion, e.g., in the event of a disaster, from the viewpoint of ensuring voice communication. A method contemplated for this communication restriction is to restrict a domain unit, either the CS domain for voice communication or the PS domain for packet communication, and thereby restrict the entire voice communication or the entire packet communication. Patent Document 1 below is a document disclosing such technology and describes that the communication can be restricted for each call type in CDMA 2000; e.g., it describes that the restriction is implemented for each call type in such a manner that the voice communication is allowed, while electronic mail is set as an object of the communication restriction (cf. paragraphs 0010 and 0011 in Patent Document 1).
Patent Document 1: Japanese Patent Application Laid-open No. 2006-186686

DISCLOSURE OF THE INVENTION

Problem to be Solved by the Invention

In passing, the recent cell phones allow users to use service classes such as push-to-talk (so called PoC which will be abbreviated as push talk) and a disaster message board (specific site), in addition to the service classes such as voice communication, videophone, electronic mail, and web browsing (so called common sites).

With the cell phones permitting use of such various service classes, confirmation of safety through the voice communication or the disaster message board is more important than the other service classes during the network congestion due to a disaster or the like. As described above, it is necessary to control the traffic by setting priorities for the respective service classes used by the general subscribers.

However, the conventional communication restricting method, e.g., the restricting method described in Patent Document 1 permits only the restriction for each call type, i.e., permits the restriction object to be designated only by domain unit; e.g., the restriction is to restrict the CS domain unit for voice communication or to restrict the PS domain unit for packet communication. In the case of the cell phones permitting use of various service classes like the recent cell phones, therefore, it was infeasible to designate appropriate restriction objects according to circumstances of use of users.

In order to solve the above problem, an object of the present invention is therefore to provide a communication device, a communication system, and a restricting method permitting a communication restriction for each service class.

Means for Solving the Problem

In order to solve the above problem, a communication device according to the present invention is a communication device in communication connection with a control device for performing access control, the communication device comprising: memory means which stores management information showing correspondence between service classes indicative of communication services that the communication device can execute, and service class codes to discriminate the service classes; restriction message receiving means which receives a restriction message indicative of a service class code from the control device; and restricting means which, when the restriction message receiving means receives the service class code, specifies a service class corresponding to the service class code stored in the memory means and implements a communication restriction in the service class.

A restricting method according to the present invention is a restricting method on a communication device in communication connection with a control device for performing access control, the communication device storing management information showing correspondence between service classes indicative of communication services and service class codes to discriminate the service classes, the restricting method comprising: a restriction message receiving step of receiving a restriction message indicative of a service class code from the control device; and a restricting step of, when the service class code is received in the restriction message receiving step, specifying a service class corresponding to the service class code stored preliminarily, and implementing a communication restriction in the service class.

According to the present invention, the management information is stored in the form of information showing the correspondence between the service classes indicative of the communication services that the communication device can execute, and the service class codes to discriminate the service classes, and a restriction message indicative of a service class code is received from the control device. When the service class code is received, the service class corresponding to the service class code preliminarily stored is specified and the communication restriction is implemented in the service class. This permits the communication restriction to be implemented in each service class unit. An operator to send the service class code is allowed to manipulate the content of the service class code and to perform a simple transmission process of properly changing the service class code, whereby the service class as a restriction object can be readily changed. Use of information with small information amount like the service class code can minimize the information amount for broadcast.

The communication device of the present invention is preferably configured as follows: it comprises information receiving means which receives management information showing correspondence between service classes and service class codes set by each operator of the control device; the memory means stores the management information received by the information receiving means.

According to this invention, the communication device can receive the management information showing the correspondence between the service classes and the service class codes set by the operator of the control device and store the received management information. This allows the operator to determine a service class as a restriction object in correspondence to a service class code, whereby it is easy to adapt for increase in the number of service classes.

In the communication device of the present invention, preferably, the information receiving means receives management information showing correspondence between control signal classes and service class codes, the memory means stores the service class codes and the control signal classes included in the management information received by the information receiving means, in correspondence to each other, and the restricting means implements a restriction process based on the management information stored in the memory means.

According to this invention, the communication device can receive the management information showing the correspondence between the control signal classes and the service class codes and store the service class codes and the control signal classes included in the received management information, in correspondence to each other, whereby the restriction object cannot be only a service class but can also be a control signal, thereby permitting a more appropriate restriction.

In the communication device of the present invention, preferably, the information receiving means receives management information showing correspondence between identification information to specify core nodes, and service class codes, the memory means stores the service class codes and the identification information included in the management information received by the information receiving means, in correspondence to each other, and the restricting means implements a restriction process based on the management information stored in the memory means.

According to this invention, the communication device can receive the management information showing the correspondence between the identification information to specify core nodes, and the service class codes and store the service class codes and the identification information included in the received management information, in correspondence to each other, whereby the restriction object cannot be only a service class but can also be an access control on a core node, thereby permitting a more appropriate restriction.

In the communication device of the present invention, preferably, the memory means stores version information indicative of an update state of the management information, the communication device further comprises version transmitting means for transmitting the version information stored in the memory means, to the control device, and the information receiving means receives management information corresponding to latest version information transmitted in response to a transmission process by the version transmitting means.

According to this invention, the communication device is configured to store the version information indicative of the update state of the management information, to transmit the preliminarily stored version information to the control device, and to acquire the management information corresponding to the latest version information, whereby the latest management information can be always carried out by the simple control.

In the communication device of the present invention, preferably, the restriction message further includes probability information indicative of a rate of restriction, and the restricting means determines whether a restriction is necessary, based on the probability information.

According to this invention, the restriction can be carried out with a probability according to the probability information indicated by the restriction message, and the restriction message can be a simple one.

In the communication device of the present invention, preferably, the restriction message further includes identification information to specify communication devices as restriction objects, and the restricting means determines whether the host device is a restriction object, based on the identification information.

According to this invention, the operator is allowed to designate a restriction probability, whereby a more certain restriction process can be implemented.

A communication system according to the present invention is a communication system comprising the above communication device and a control device, wherein the control device comprises information transmitting means for transmitting management information to the communication device.

According to this invention, the management information set by the operator can be transmitted to the communication device, and the management information can be changed as needed.

In the communication system of the present invention, preferably, the control device further comprises: version receiving means for receiving version information from the communication device; and version determining means for determining whether the version information received by the version receiving means is latest version information; when the version determining means determines that the received version information is not the latest version information, the information transmitting means transmits management information designated by the latest version information.

According to this invention, when the received version information is determined not to be the latest version information, based on the received version information, the management information designated by the latest version information can be transmitted to the communication device, whereby the communication device can always retain the management information of the latest version.

Effect of the Invention

The present invention allows the communication restriction to be implemented for each service class unit. Furthermore, the operator to notify of a service class code is allowed to manipulate the notification information of the service class code, whereby the service class as a restriction object can be readily changed through the simple process of properly changing the correspondence between the service class code and the service class. Since the present invention permits use of the information with small information amount like the service class code, the information amount for broadcast can be minimized.

BRIEF DESCRIPTION OF THE DRAWINGS

FIG. 3 is a conceptual diagram showing a summary of service class information.

FIG. 6 is an explanatory drawing showing restriction information.

FIG. 12 is a configuration diagram showing a system configuration of a communication system 10a.

FIG. 13 is an explanatory drawing showing service class information for the PS domain stored in a memory unit 402a.

FIG. 14 is an explanatory drawing showing service class information for the CS domain stored in a VLR 500.

FIG. 16 is a sequence diagram showing processing upon an update of service class information by processing from the SGSN 400, based on transmission of a location registration request from a user equipment 100a.

DESCRIPTION OF REFERENCE SYMBOLS 10 or 10a communication system; 100 or 100a user equipment; 101 notice information receiving unit; 102 memory unit; 103 restriction message receiving unit; 104 restricting unit; 105 communication processing unit; 201 restriction instruction message transmitting unit; 401 setting unit; 402 or 402a memory unit; 403 location registration request receiving unit; 404 determining unit; 405 notice information transmitting unit; 501 setting unit; 502 memory unit; 503 location registration request receiving unit; 504 determining unit; 505 notice information transmitting unit.

BEST MODE FOR CARRYING OUT THE INVENTION

The present invention can be readily understood in view of the following detailed description with reference to the accompanying drawings presented for an embodiment. The following will describe the embodiment of the present invention with reference to the accompanying drawings. The same portions will be denoted by the same reference symbols as much as possible, without redundant description.

Figure 1:
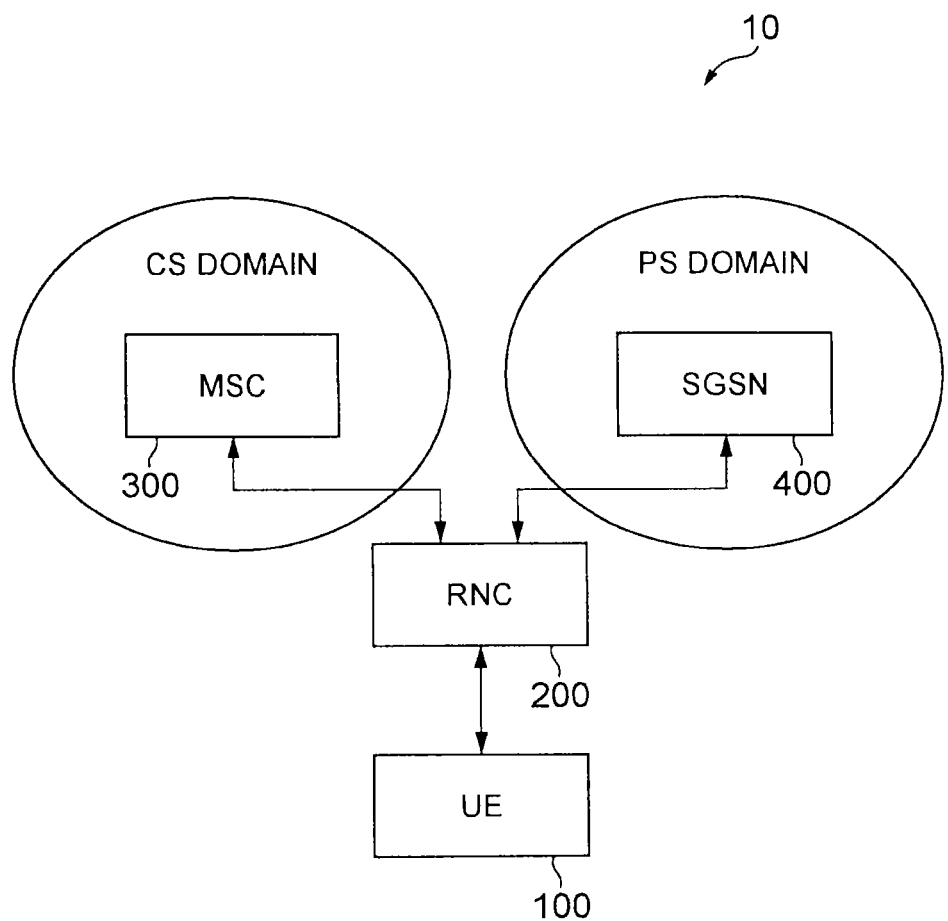
FIG. 1 is a configuration diagram showing a system configuration of a communication system 10 in an embodiment of the present invention.

FIG. 1 is a configuration diagram showing a system configuration of a communication system 10 in the present embodiment. As shown in FIG. 1, the communication system 10 is constructed with a mobile user equipment 100 being a communication device, an RNC (Radio Network Controller: radio control unit) 200 being a radio control device, an MSC (Mobile Switching Center: circuit switch) 300, and an SGSN (Serving GPRS Support Node: packet switch) 400.

When the user equipment 100 starts executing a voice communication connection, it establishes a communication connection through a base station (not shown) and the RNC 200 with the MSC 300. The RNC 200 is a radio control unit to perform radio control over the user equipment 100. The MSC 300 is a circuit switching station for a mobile communication network used during voice communication, and performs communication connection control between the user equipment 100 and a correspondent equipment. In the present embodiment, a network concept using the MSC 300 is called a CS domain. The SGSN 400 is a node that performs location management, security management, and access control of user equipment 100 and that performs control over packet communication. In the present embodiment, a network concept to perform packet communication is called a PS domain.

Figure 2:
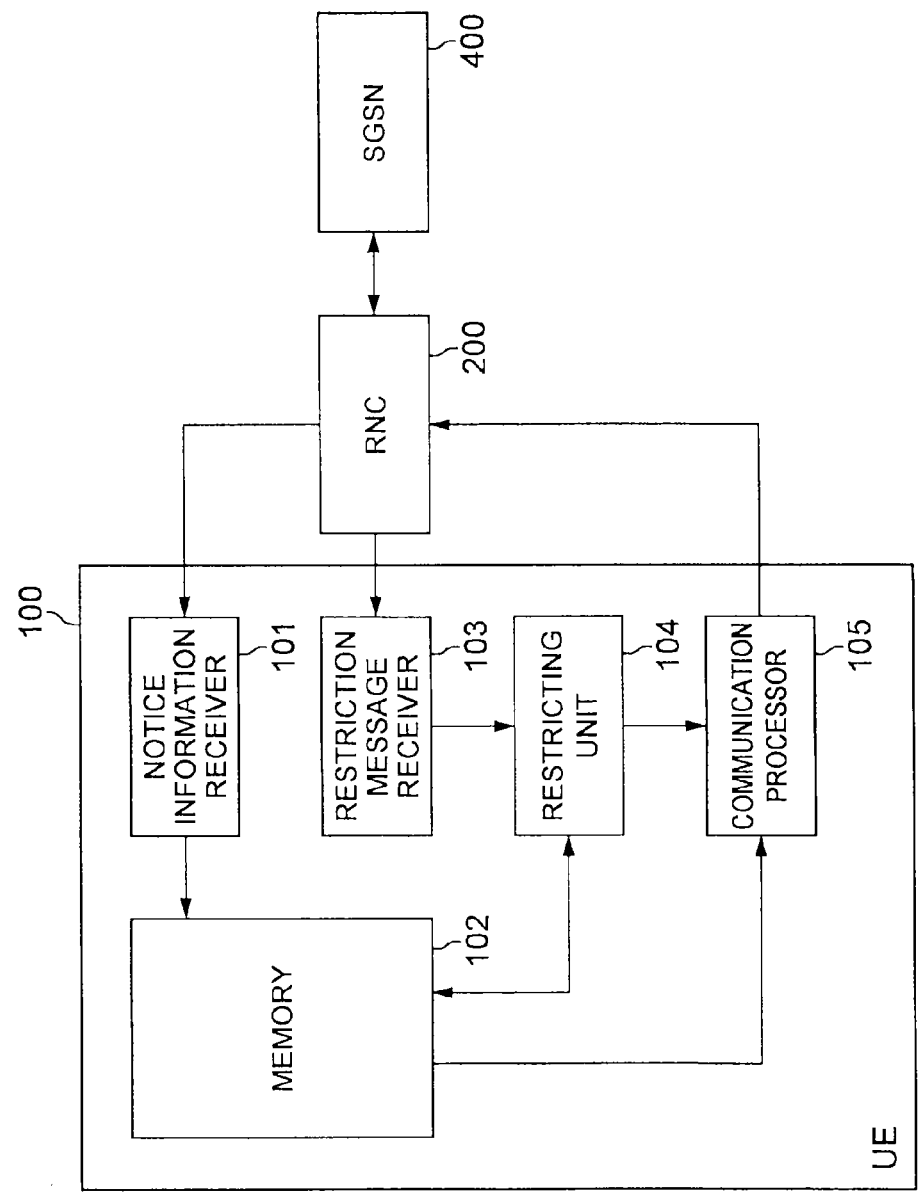
FIG. 2 is a block diagram showing a configuration of a user equipment 100.

The below will describe a configuration of the user equipment 100 in the communication system 10 constructed as described above. FIG. 2 is a block diagram showing the configuration of the user equipment 100. As shown in FIG. 2, the user equipment 100 is constructed with a notice information receiving unit 101 (information receiving means), a memory unit 102 (memory means), a restriction message receiving unit 103 (restriction message receiving means), a restricting unit 104 (restricting means), and a communication processing unit 105 (version transmitting means).

Figure 19:
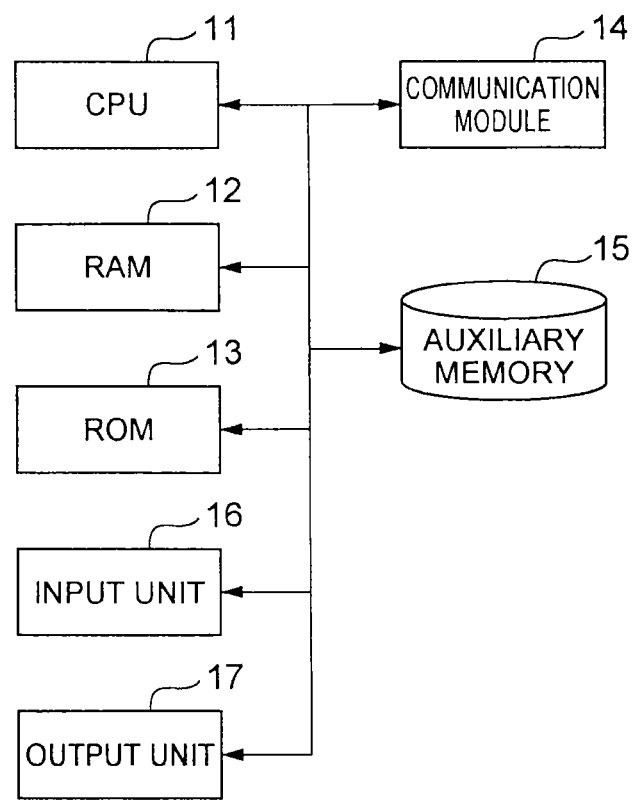
FIG. 19 is a block diagram showing a hardware configuration of the user equipment 100 and others.

Each of these functions is implemented by a hardware configuration shown in FIG. 19. FIG. 19 is a hardware configuration diagram of the user equipment 100. The user equipment 100 is physically constructed, as shown in FIG. 19, as a computer system including a CPU 11, a RAM 12 and a ROM 13 being main memory units, an auxiliary memory unit 15 such as a hard disk, an input unit 16 such as a keyboard and a mouse being input devices, an output unit 17 such as a display, a communication module 14 being a data transceiving device such as a network card, and so on. Each of the functions described with FIG. 2 is implemented by letting the computer system retrieve predetermined computer software onto the hardware such as the CPU 11 and RAM 12 shown in FIG. 19, thereby operating the communication module 14, input unit 16, and output unit 17 under control of the CPU 11, and performing reading and writing of data from and into the RAM 12 and the auxiliary memory unit 15. Each of the functional blocks will be described below based on the functional blocks shown in FIG. 2.

The notice information receiving unit 101 is a part that receives service class information notified of by the SGSN 400 and that receives service class information included in broadcast information delivered from the RNC 200 or service class information included in a location registration accept message, as management information. This service class information will be explained below.

FIG. 3 is a conceptual diagram showing a summary of the service class information. As shown in FIG. 3, the service class information is composed of a service class information version (which will be referred to hereinafter as the service class information version), service class numbers, service classes, and control signal classes. The service class information version is information indicative of an update state, and information used for determining whether the latest service class information is effective in the user equipment 100. In the present embodiment, the service class information version is assumed to be composed of an MCC (country code), an MNC (mobile network code), and a unique number. Use of MCC and MNC permits us to generate a unique number all over the world.

The service class numbers are numerical information indicative of #0 to #4 and information for discriminating the service classes described below. In the present embodiment, this service class number is delivered as included in a restriction instruction message and a service class corresponding to this service class number is set to be a communication restriction object in the user equipment 100.

The service classes are information indicative of services as restriction objects. In the present embodiment, a service as a restriction object is specified by APN (Access Point Number) indicative of an access point and a code indicative of either a service for the CS domain or a service for the PS domain. For example, PS&APN#1 is described in service class number #1 and it indicates that mail is restricted. The other service classes are web browsing (PS&APN#2) and push talk (PS&APN#3) described corresponding to service class number #1 in FIG. 3. Furthermore, voice communication (CS&TS11) and videophone (CS&BS30) are described corresponding to service class number #2. It is noted that APN may be defined so as to discriminate the web browsing and the disaster message board from each other, which is not shown. In that case, an extra site like the disaster message board may be excluded from the communication restrictions.

The control signal classes are information indicative of control signals as restriction objects. For example, Session Management Message (control signal for call control) is described corresponding to service class number #4 and Mobility Management Message (control signal for location registration) corresponding to service class number #5. It is also possible to store identification information to specify core nodes such as SGSN 400, MSC 300, and VLR, as made to correspond as control signal classes. This permits the system to impose a restriction on a core node under congestion and thereby to execute a more appropriate restriction process. Since the communication layer of control signal classes is lower than the communication layer of service classes, the control signal classes are given priority of restriction over the service classes. In the present embodiment, the control signal classes are not essential, but it is preferable to store the control signal classes.

"All are barred," which indicates that all communications are restricted, is described in service class number #0 and when the service class number is null, "None is barred," which indicates that there is no restriction on any communications, is described. Furthermore, "none" means that nothing is set. In the above-described example the service class information includes the descriptions of service classes and control signal classes as restriction objects, but it is also possible to adopt a configuration wherein the service class information includes descriptions of service classes and control signal classes excluded from restriction objects. Namely, it is possible to adopt such a scheme that all the services are defined as restriction objects in principle by some processing and that the service classes and control signal classes described in the service class information are excluded from the restriction objects. The above showed the configuration wherein the restriction objects were specified by APNs, but it is also possible to adopt such a scheme that address information such as URLs is directly described and that restrictions are imposed on communications with the address information.

The description will continue referring back to FIG. 2. The memory unit 102 is a part that stores the service class information received by the notice information receiving unit 101. A specific example of this service class information is as described above (with FIG. 3).

The restriction message receiving unit 103 is a part that receives a restriction instruction message including a service class number, from the RNC 200. For example, the restriction instruction message is included in broadcast information and in that case, the restriction message receiving unit 103 receives the broadcast information.

The restricting unit 104 is a part that stores the service class number received by the restriction message receiving unit 103 and that performs a restriction based on the service class number. For example, when the restriction message receiving unit 103 receives service class number #1, the restricting unit 104 keeps the number stored. Thereafter, with user's communication manipulation, the restricting unit 104 extracts from the memory unit 102 the service class, the control signal class, and the identification information of core nodes of access restriction objects corresponding to the service class number #1 and controls the communication processing unit 105 so as to restrict communications based on the service class (mail, web browsing, and push talk in the present embodiment) and the control signal class corresponding to the service class number #1 and access to core nodes specified by the identification information, prior to execution of communication processing by the communication processing unit 105.

The communication processing unit 105 is a part that executes communication processing such as voice communication, videophone, electronic mail, web browsing, and push talk. The communication processing unit 105 is a part that transmits a location registration request message and a service class information version to the SGSN 400 or MSC 300; for example, it transmits the location registration request message at the first activation after a subscription, with a change in a location registration area, or at an end of a periodic location registration timer. The communication processing unit 105 also transmits to the SGSN 400 the service class information version stored in the memory unit 102, together with the location registration request message. Furthermore, it can receive SMS, receive service class information by SMS OTA, and update the service class information in the memory unit 102.

Figure 4:
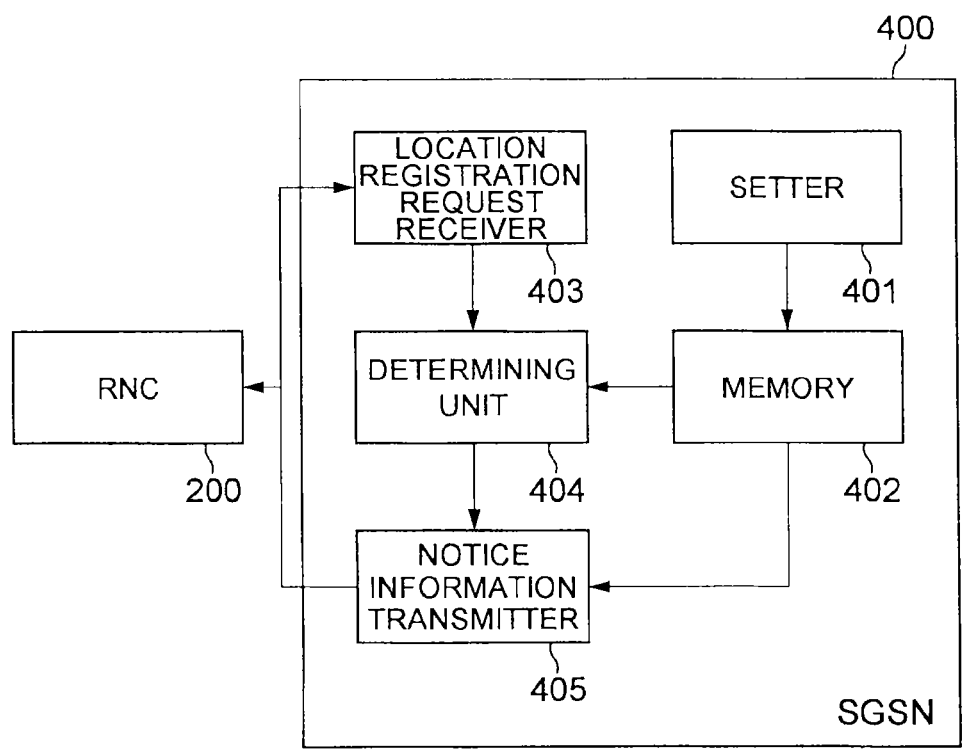
FIG. 4 is a block diagram showing a configuration of an SGSN 400.

The following will describe a configuration of the SGSN 400. FIG. 4 is a block diagram showing the configuration of the SGSN 400. As shown in FIG. 4, the SGSN 400 is constructed with a setting unit 401, a memory unit 402, a location registration request receiving unit 403 (version receiving means), a determining unit 404 (version determining means), and a notice information transmitting unit 405 (information transmitting means). The SGSN 400 has the hardware configuration shown in FIG. 19, as the user equipment 100 does, and each of the functions shown in FIG. 4 is implemented through operation of the CPU according to a program stored in the ROM. Each component will be described below.

The setting unit 401 is a part that sets the service class information through manipulation by an operator of the SGSN 400 and that sets the service class numbers and the service classes in correspondence to each other. The set service class information is stored in the memory unit 402.

The memory unit 402 is a part that stores the service class information set by the setting unit 401. Specifically, as shown in FIG. 3, the service class information stored is the service class information composed of the service class information version, the service class numbers, the service classes, and the control signal classes. The details are as described above.

The location registration request receiving unit 403 is a part that receives a location registration request message sent for location registration with a predetermined operation at the user equipment 100 and a service class information version sent along with the location registration request message. When the location registration request receiving unit 403 receives the service class information version, it outputs a version number thereof to the determining unit 404.

The determining unit 404 is a part that determines whether the service class information version received by the location registration request receiving unit 403 is the latest version. Namely, it compares the service class information version stored in the memory unit 402, with the received service class information version; when they agree, it determines that the received service class information version is the latest version; when they disagree, it determines that the received service class information version is an old version.

The notice information transmitting unit 405 is a part that transmits the service class information, based on the result of the version comparison determined by the determining unit 404. Specifically, when the determining unit 404 determines that the service class information version is not the latest, the notice information transmitting unit 405 extracts the latest service class information from the memory unit 402, adds the latest service class information to a location registration accept message as a response to the location registration request message, and transmits the response message through the RNC 200 to the user equipment 100. When it is determined to be the latest, no special process is carried out as to the service class information and only the location registration accept message is transmitted.

This notice information transmitting unit 405 is a part that, when the setting unit 401 sets new service class information and it is stored in the memory unit 402, instructs the RNC 200 and base stations under the RNC 200 to put the service class information in broadcast information and transmit the service class information. This makes the RNC 200 and the base stations transmit the broadcast information including the service class information.

Figure 5:
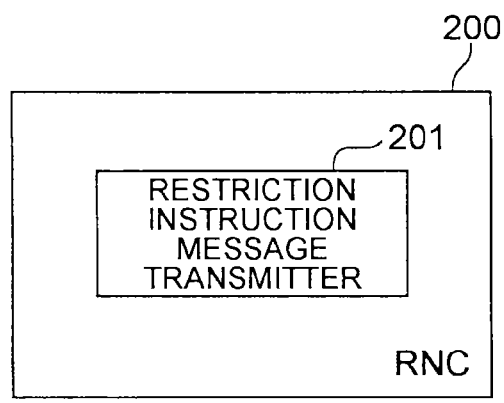
FIG. 5 is a block diagram showing a configuration of an RNC 200.

The below will describe a configuration of the RNC 200. FIG. 5 is a block diagram showing the configuration of the RNC 200. This RNC 200 is constructed with a restriction instruction message transmitting unit 201. The RNC 200 is also realized similarly by the hardware configuration shown in FIG. 19.

The restriction instruction message transmitting unit 201 is a part that transmits restriction information set by an operator of the RNC 200, as a restriction instruction message. For example, the restriction instruction message transmitting unit 201 transmits through a base station to the user equipment 100, the restriction instruction message including the restriction information in the form of correspondence between UE class numbers #0 to #9 and service class numbers #0 to #4 or null. The base station transmits the broadcast information including the restriction instruction message, to the user equipment 100.

This restriction information is described as shown in FIG. 6. Namely, the UE class numbers and the service class numbers are set in correspondence to each other and held in the restriction instruction message transmitting unit 201. The UE class numbers are terminal numbers set for respective user equipments and any one of #0 to #9 is set for each user equipment 100. FIG. 6 (a) shows an example of restriction percentage of 50%, and shows that the restriction is imposed on user equipments 100 having odd UE class numbers such as UE class numbers #1, #3, . . . , #9. FIG. 6 (b) shows an example of restriction percentage of 80%.

A modification example may be such that the restriction instruction message includes the restriction information in the form of correspondence between probability information as a description of any numerical value from restriction probabilities from 0% to 100% indicating restriction rates, and the service class numbers #0 to #4 or null. The user equipment 100 receiving this restriction instruction message has a random number generator (not shown) for generating a double-digit number and the user equipment 100 compares a random number generated by this random number generator, with the numeral described as the probability information, whereby it can determine whether there is a restriction instruction. For example, in a case where 50 (meaning 50%) is described as the probability information and where the random number generated is 10, since the probability information is larger than the random number, the user equipment 100 (restricting unit 104) can determine that there is a restriction. On the contrary, when the random number generated is 60, since the probability information is smaller than the random number, the user equipment 100 (restricting unit 104) can determine that there is no restriction. The user equipment may also be configured to determine that there is a restriction when the probability information is smaller than the random number. If the numeral described as the probability information is indicated by a ratio (e.g., 0.8 indicating 80% or the like) being an indication different from percentage, it is preferable to multiply the ratio by 100 to obtain a double-digit integer. The configuration as described above eliminates the need for inclusion of the UE class numbers in the restriction message, which can reduce the information amount of the restriction message and simplify the configuration thereof.

The present embodiment is described using only the so-called home network, but a roaming network for roaming also has the same system configuration. Therefore, when the user equipment 100 is located in the home network, it follows the restriction information designated in the home network; when it is located in a roaming network, it follows the restriction information designated in the roaming network. Since the user equipment 100 follows the restriction information designated in each network, when it changes an access network, it receives and stores the service class information being the restriction information designated in each network.

The below will describe the operations of the user equipment 100, RNC 200, and SGSN 400 constructed as described above.

Figure 7:
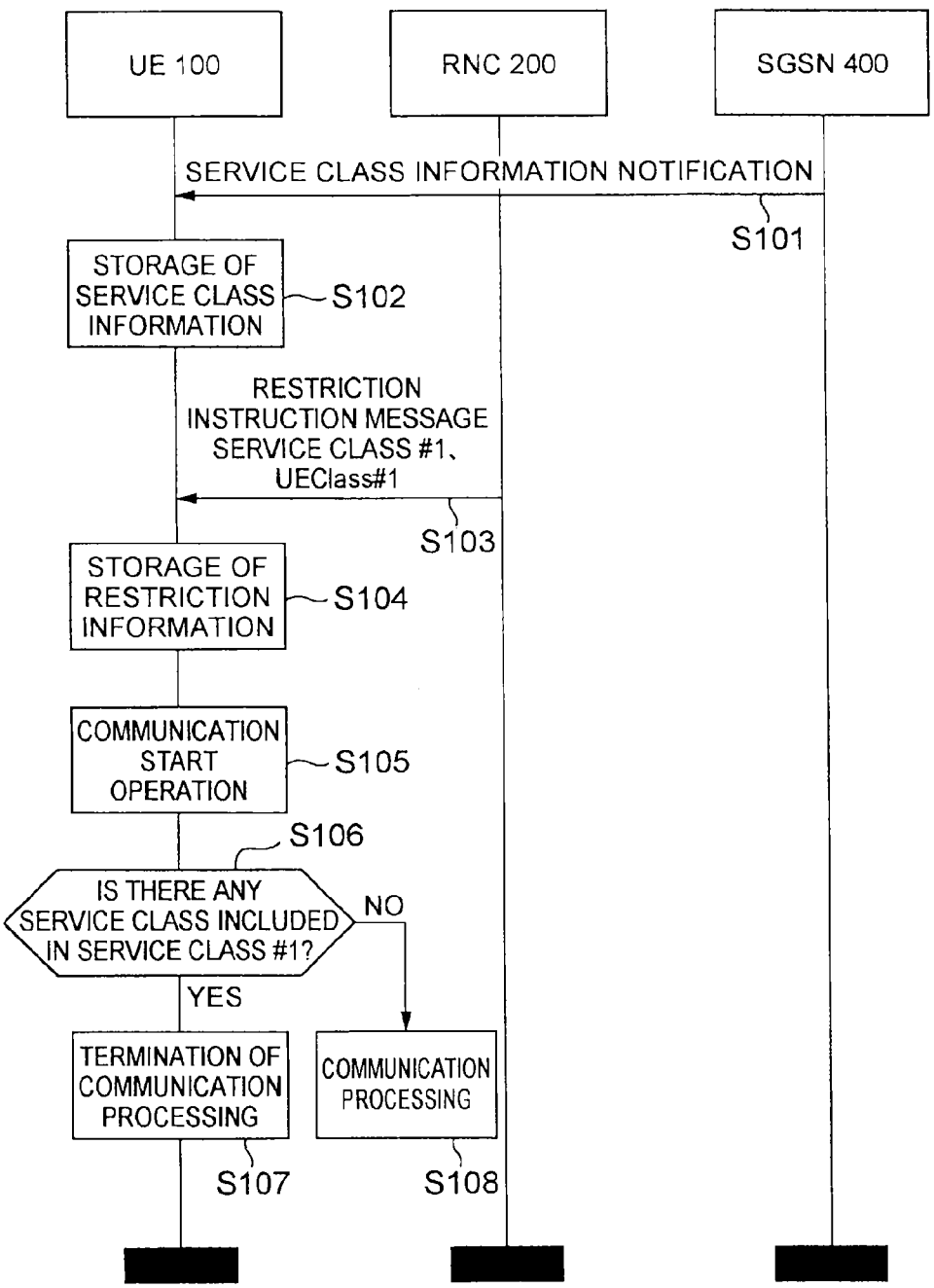
FIG. 7 is a sequence diagram showing an operation of the user equipment 100 upon reception of service class information from the SGSN 400.

FIG. 7 is a sequence diagram showing the operation of the user equipment 100 upon reception of the service class information from the SGSN 400.

The SGSN 400 sends the broadcast information including the service class information and the notice information receiving unit 101 in the user equipment 100 receives the service class information (S101). Then the service class information is stored in the memory unit 102 (S102).

Thereafter, when the restriction message receiving unit 103 receives the restriction instruction message (broadcast information) including the restriction information from the RNC 200 (S103), the restriction information (to specify a service class as a restriction object) is stored in the restricting unit 104 (S104). It is assumed herein that service class number #1 is received.

Thereafter, when the user manipulates the user equipment 100 to perform communication processing (S105), the restricting unit 104 determines whether the communication processing applies to the communications of the service class or the control signal class designated by the stored service class number or the access to core nodes specified by identification information (S106). For example, the restricting unit 104 determines whether the service class associated with the communication processing in progress is the service class corresponding to service class number #1, i.e., any one of mail, web browsing, and push talk.

When it is determined that the service class is a restriction object, the communication processing by the communication processing unit 105 is terminated based on control by the restricting unit 104 (S107). When the service class is determined not to be any restriction object, the restriction control by the restricting unit 104 is not carried out and the communication processing unit 105 executes the manipulated communication processing (S108).

As operating in this manner, the user equipment 100 can receive the service class information from the SGSN 400 and execute the communication restriction on the service class designated according to the service class information.

Figure 8:
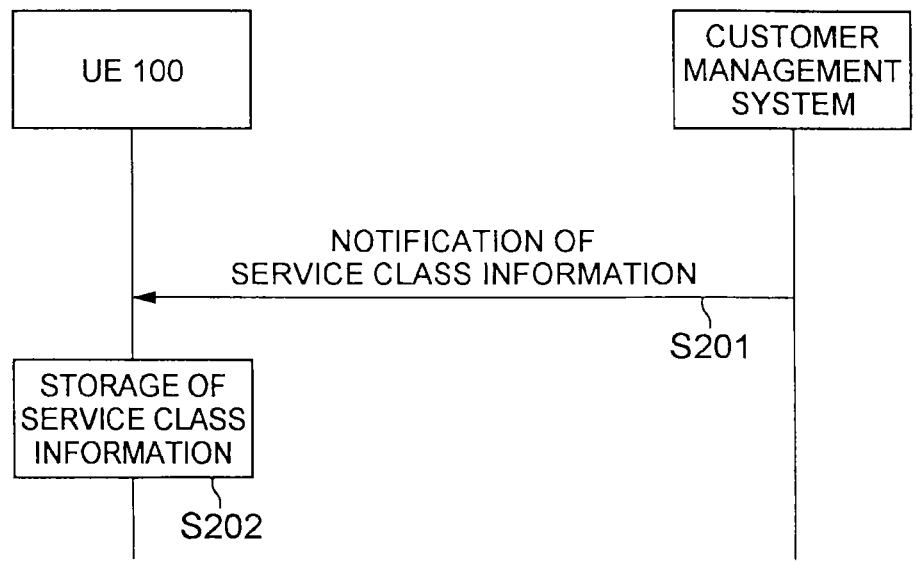
FIG. 8 is a sequence diagram showing processing upon reception of service class information from a customer management system.

The below will describe a specific example of notifying the user equipment 100 of the service class information. FIG. 8 is a sequence diagram showing processing upon reception of the service class information from a customer management system.

The customer management system herein is a dedicated customer management terminal installed, for example, at a cell phone shop or the like, and an operator (shop assistant) of the cell phone shop manipulates the terminal to transmit the service class information through a wired or wireless connection (S201). The user equipment 100 receives it to store the service class information (S202). Thereafter, the communication restriction is implemented based on the stored service class information and the restriction instruction message.

Figure 9:
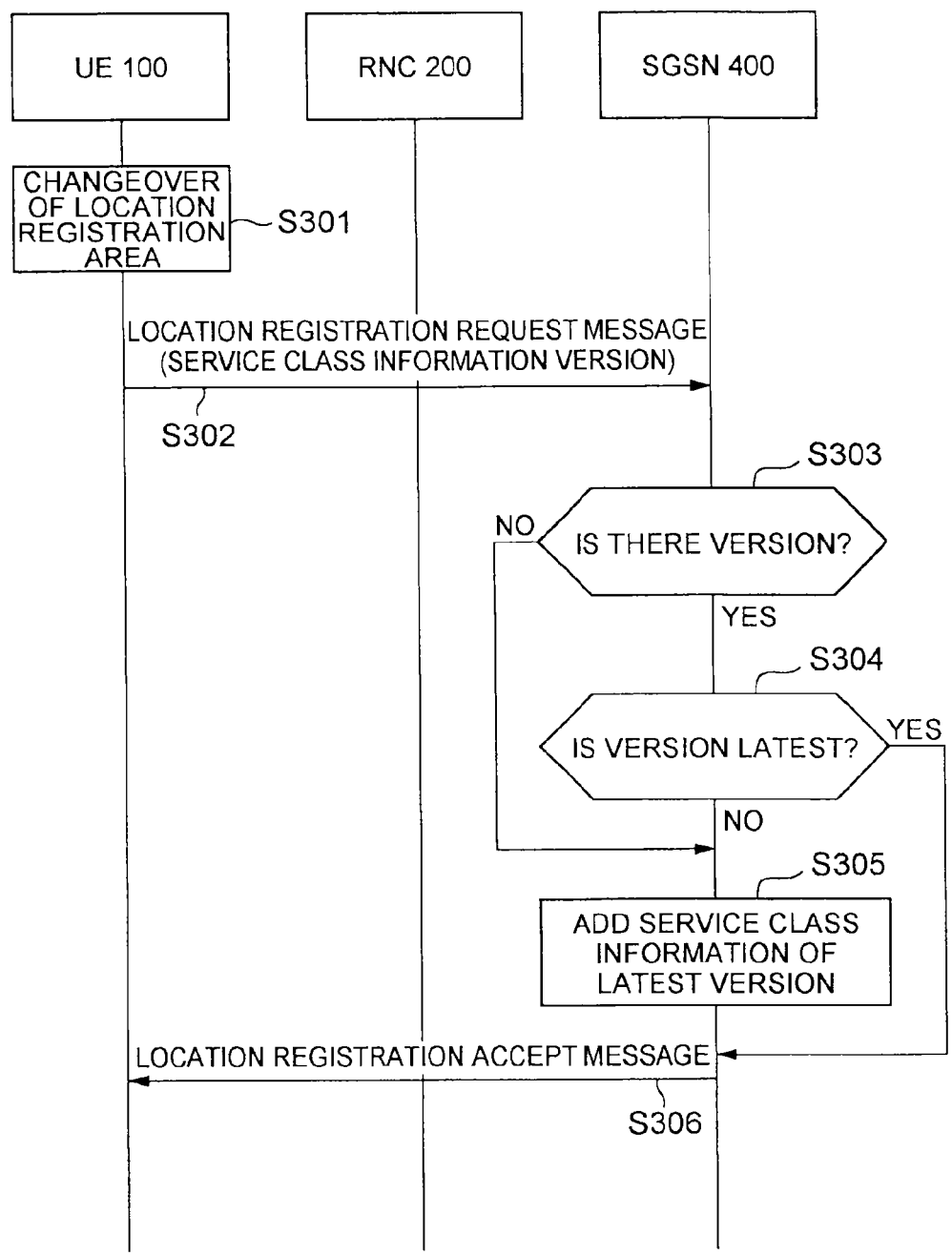
FIG. 9 is a sequence diagram showing processing upon an update of service class information, based on transmission of a location registration request from the user equipment 100.

The below will describe processing upon an update of the service class information in the user equipment 100. FIG. 9 is a sequence diagram showing processing upon an update of the service class information by processing from the SGSN 400, based on transmission of a location registration request message from the user equipment 100. The present embodiment is based on the assumption that the system is configured to perform so-called combined location registration (Combined Update) in such a manner that, when the user equipment 100 requests location registration to the CS domain, the SGSN 400 in the PS domain also receives the request and the SGSN 400 performs the location registration process to the CS domain.

In the user equipment 100, it is determined whether there was a changeover of its location registration area (S301). When it is determined in the user equipment 100 that there was a changeover of the location registration area, the location registration request message and the service class information version are sent to the SGSN 400 (S302). The condition for the user equipment 100 to transmit the location registration request message and service class information version can be the first activation after a subscription of the user equipment 100 or an end of a periodic location registration timer, as well as the changeover of location registration area.

In the SGSN 400, the location registration request receiving unit 403 receives the location registration request message and then the location registration request receiving unit 403 determines whether the service class information version is received (S303). When it is determined herein that the service class information version is received (S303: YES), the determining unit 404 determines whether the version is the latest version (S304).

When it is determined that the version is not the latest version or when it is determined in S303 that the service class information version is not received, the notice information transmitting unit 405 adds the service class information of the latest version to the location registration accept message (S305) and the notice information transmitting unit 405 transmits the location registration accept message to the user equipment 100 (S306). In the user equipment 100, the notice information receiving unit 101 receives the location registration accept message and then extracts the service class information, and the service class information stored in the memory unit 102 is updated thereby.

In this manner, the update processing of service class information is carried out based on the location registration request message.

Figure 10:
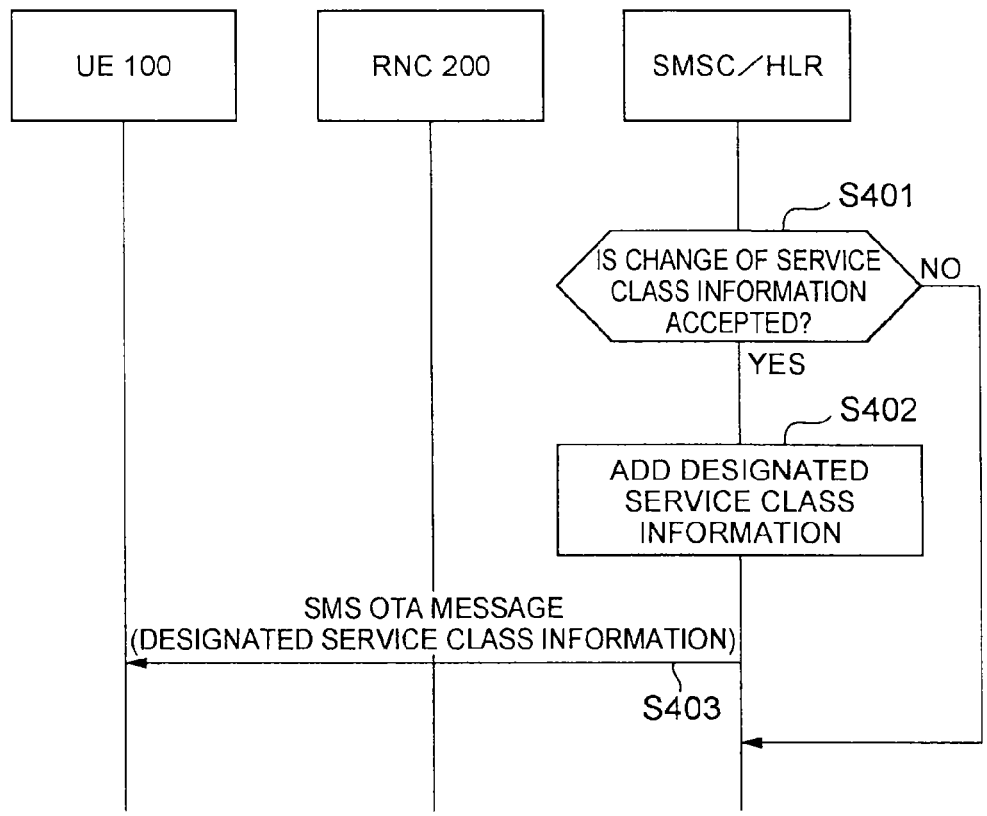
FIG. 10 is a sequence diagram showing processing upon a manual update of service class information.

The blow will describe processing in execution of update processing of service class information for changing restriction contents for respective users. FIG. 10 is a sequence diagram showing processing in a manual update of service class information. This processing may be purposed for users failing to perform the update processing of service class information for some reason.

An operator of SMSC (SMS Center)/HLR (Home Location Register) determines whether the service class information version of user equipment 100 is the latest and whether a desired restriction content is effective, whereby it is determined in SMSC/HLR whether a change of restriction content was accepted by a certain user (S401). When it is determined that the change of restriction content was accepted, the service class information designated by the operator is added to an SMS OTA (Over The Air) message (S402) and the SMS OTA message is transmitted to the user equipment 100 (S403). The user equipment 100 extracts the service class information from the received SMS OTA message and stores it in the memory unit 102, thereby performing the update processing.

Figure 11:
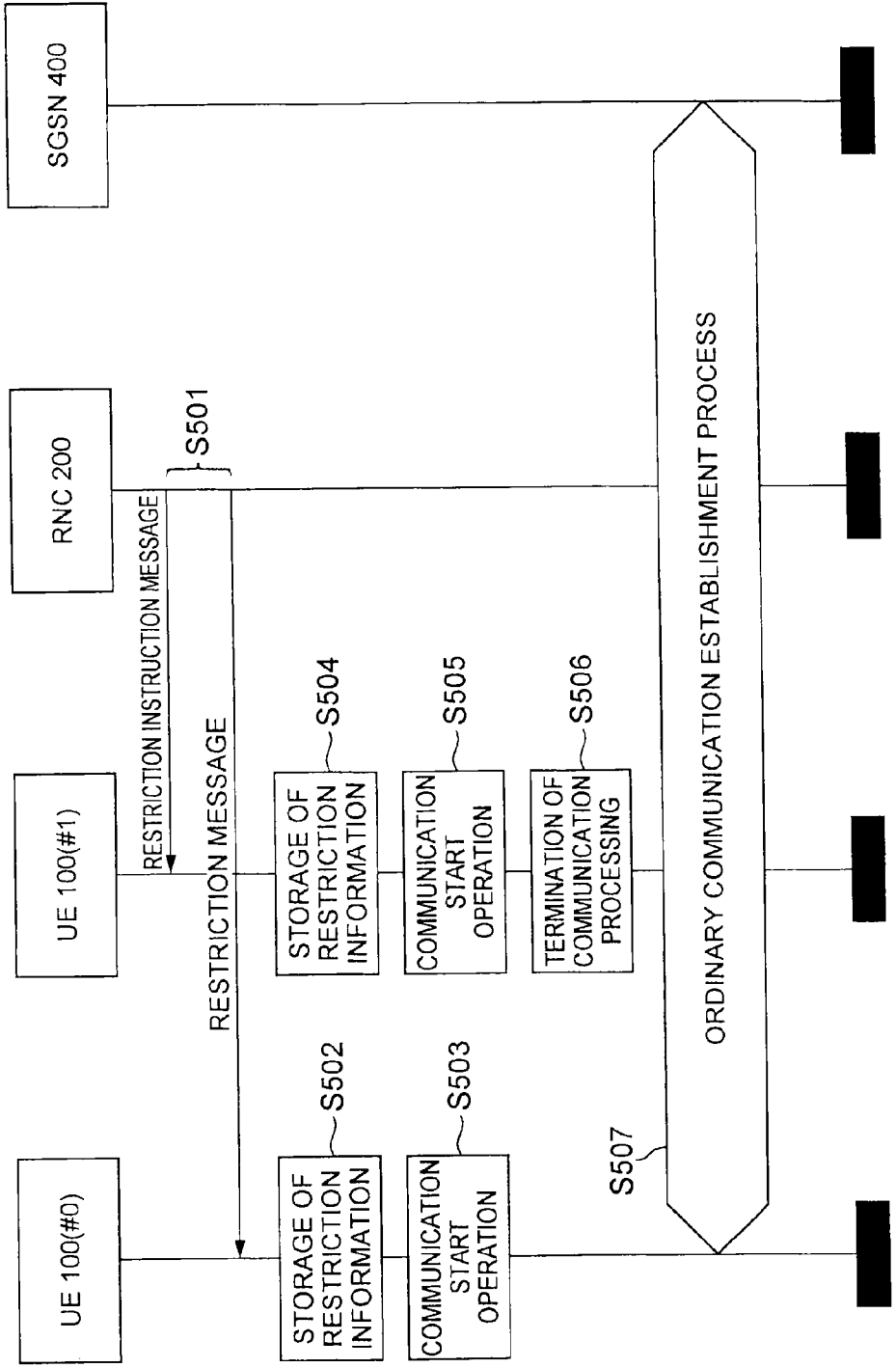
FIG. 11 is a sequence diagram showing processing upon implementation of a restriction on some user equipment 100 (UE class number #1) only.

The below will describe the difference of processing in each of user equipments 100 (UE class numbers #0 and #1) in a situation where there are a plurality of user equipments 100 and where the restriction instruction message is transmitted to the plurality of user equipments 100 (UE class numbers #0 and #1). FIG. 11 is a sequence diagram showing processing in imposing a restriction on only some user equipment 100 (UE class number #1).

First, the RNC 200 transmits a restriction message (broadcast information) (S501). This restriction message includes restriction information indicative of the service class number of null for UE class number #0 and service class number #1 for UE class number #1. In service class number #1, as shown in FIG. 3, mail, web browsing, and push talk are set as restriction objects.

The restriction information included in the restriction message is stored in the user equipment 100 (UE class number #1) (S504). Thereafter, when the user performs a communication start operation of a restriction object such as mail (S505), the communication processing is terminated (S506).

On the other hand, the restriction information included in the restriction message is stored in the user equipment 100 (UE class number #0) (S502). Since there is no restriction object (the service class number is null) for this user equipment 100 (UE class number #0), when it performs an operation to start communication (S503), a communication establishing process is carried out without any particular restriction (S507). The foregoing restriction processing is the restriction on the service classes, but the same is also applicable to the restriction on the control signal classes and the access restriction on core nodes.

The above communication system 10 is the application to the communication system using the mobile communication network, but the present invention is not limited to this example. For example, the present invention is also applicable to a communication system using WLAN (Wireless Local Area Network). In that case, the communication system 10 is provided with WLANAN (Access Network)/WAG (Wireless Access Gateway) in place of the RNC 200 and with a 3GPP AAA server in place of the SGSN 400. When the present embodiment is applied to LTE (Long Term Evolution: super 3G)/SAE (System Architecture Evolution) being a next-generation communication system, the communication system 10 is provided with EUTRAN (Evolved UTRAN) in place of the RNC 200 and with MME (Mobility Management Entity) in place of the SGSN 400.

Figure 12:
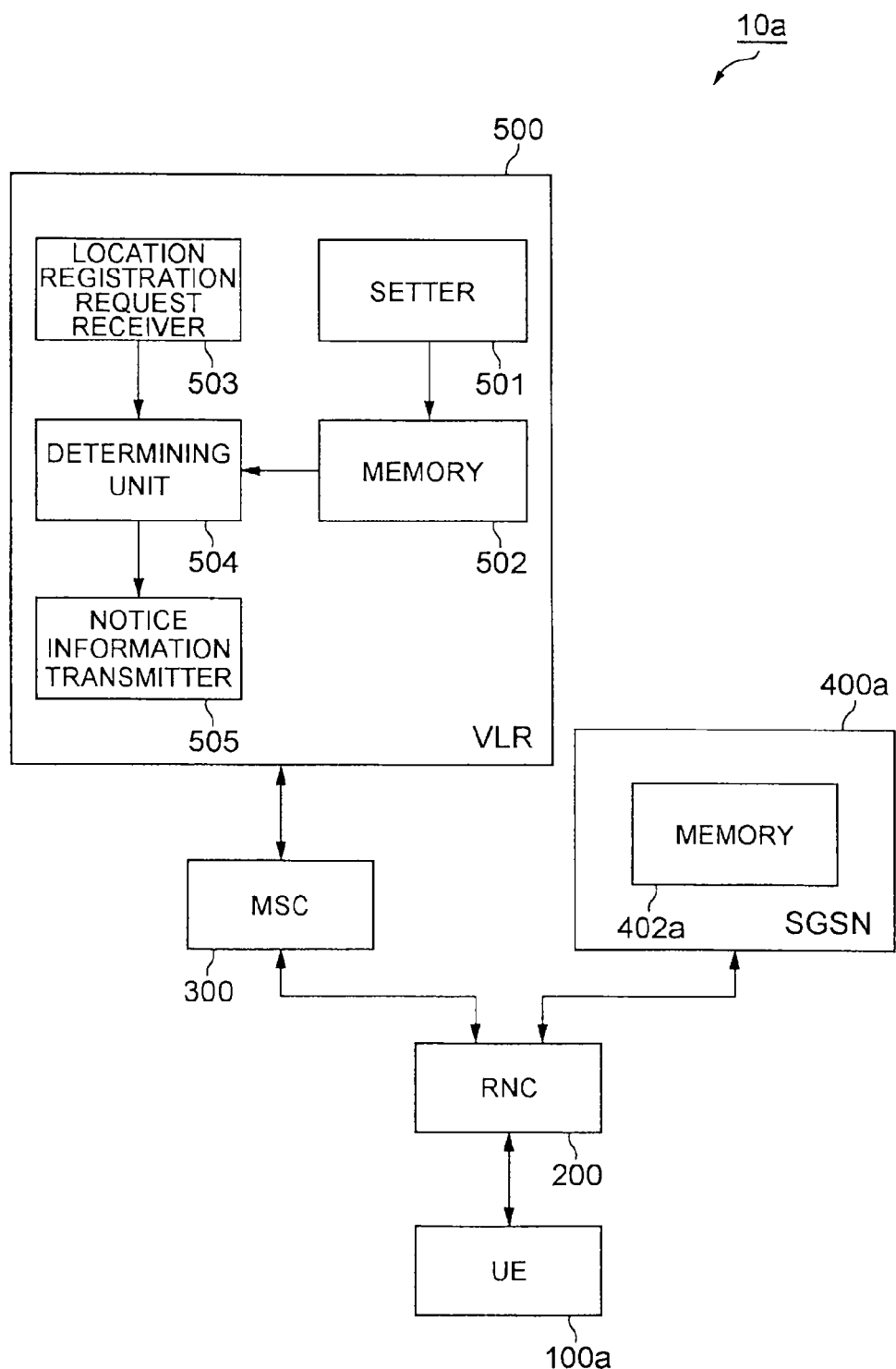

The below will describe a communication system 10a being a modification example of the communication system of the present embodiment. FIG. 12 is a configuration diagram showing a system configuration of the communication system 10a. As shown in FIG. 12, this communication system 10a is configured to perform location registration to each of the PS domain and the CS domain, instead of the combined location registration.

This communication system 10a is constructed with a user equipment 100a, an RNC 200, an MSC 300, an SGSN 400a, and a VLR (Visitor Location Register) 500.

Major differences from the communication system 10 are as described below. Specifically, the user equipment 100a performs the location registration to each of the SGSN 400a located in the PS domain and the MSC 300/VLR 500 located in the CS domain. The user equipment 100a stores the service class information separately for the PS domain and for the CS domain in the memory unit 102. Furthermore, the SGSN 400a is provided with a memory unit 402a for storing the service class information for the PS domain. The VLR 500 performs a determination on the service class information for the CS domain, through the MSC 300. Each configuration will be described below with focus on the differences. The description will be omitted as to the same contents as in the communication system 10.

The memory unit 402a in the SGSN 400a is a part that stores the service class information for the PS domain and, for example, stores the information shown in FIG. 13. FIG. 13 is an explanatory drawing showing the service class information for the PS domain stored in the memory unit 402a. As shown in FIG. 13, the memory unit 402a stores each of a service class information version, service class numbers, service classes, and control signal classes. This service class information for the PS domain is information that can specify the services to be processed in the PS domain, i.e., mail, web browsing, and push talk, as restriction objects. For example, in the example of FIG. 13, mail is made to correspond to service class number #1 and web browsing and push talk are made to correspond to service class number #2. Furthermore, the service class information version being a version number is provided with a code indicative of the service class information for the PS domain, in addition to MCC and MNC, so as to permit the user equipment 100a to discriminate it from a version number for the CS domain.

The SGSN 400a is different from the SGSN 400 in that the SGSN 400a stores the different information in the memory unit 402a and does not perform the combined location registration, but it has much the same configuration in the other processing configuration.

The VLR 500 is constructed with a setting unit 501, a memory unit 502, a location registration request receiving unit 503, a determining unit 504, and a notice information transmitting unit 505. These components are functionally much the same as the setting unit 401, memory unit 402, location registration request receiving unit 403, determining unit 404, and notice information transmitting unit 405, respectively, in the aforementioned SGSN 400. The memory unit 502 stores the service class information for the CS domain and, for example, the service class information shown in FIG. 14 is stored. In the example shown in FIG. 14, the memory unit 502 stores each of a service class information version, service class numbers, service classes, and control signal classes. This service class information for the CS domain is information that can specify the services to be processed in the CS domain, i.e., voice communication and videophone, as restriction objects. For example, in the example of FIG. 14, the voice communication is made to correspond to service class number #1, and the videophone to service class number #2. Furthermore, the service class information version being the version information is provided with a code indicative of the service class information for the CS domain, in addition to MCC and MNC, so as to permit the user equipment 100a to discriminate it from the version number for the PS domain.

Figure 15:
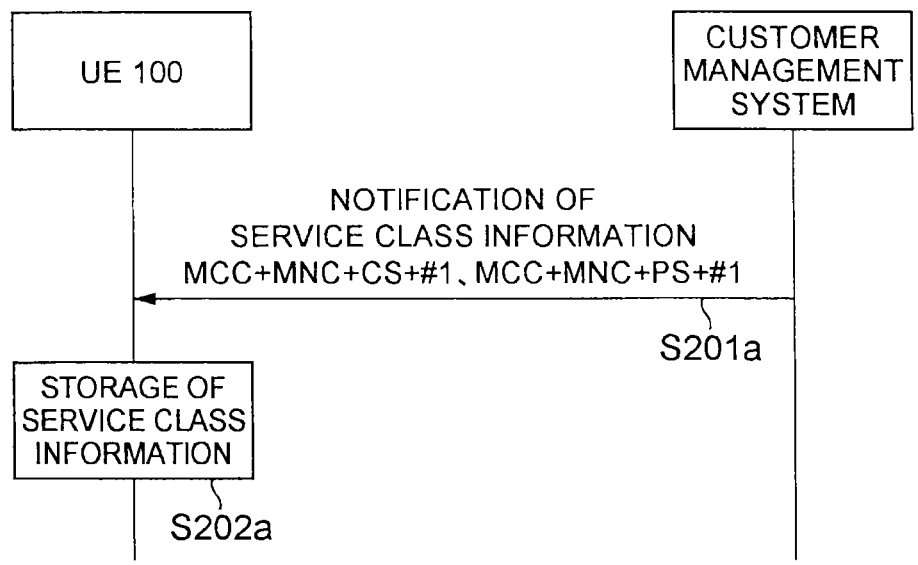
FIG. 15 is a sequence diagram showing processing upon reception of service class information from a customer management system.

The below will describe the operation of the communication system 10a constructed as described above. FIG. 15 is a sequence diagram showing processing upon reception of the service class information from the customer management system.

The customer management system transmits the CS domain version "MCC+MNC+CS+#1" and the PS domain version "MCC+MNC+PS+#1" being the service class information versions, through a wired or wireless connection to the user equipment 100a (S201a). In the user equipment 100a, the service class information is stored separately for the CS domain and for the PS domain in the memory unit 102 (S202a).

Figure 16:
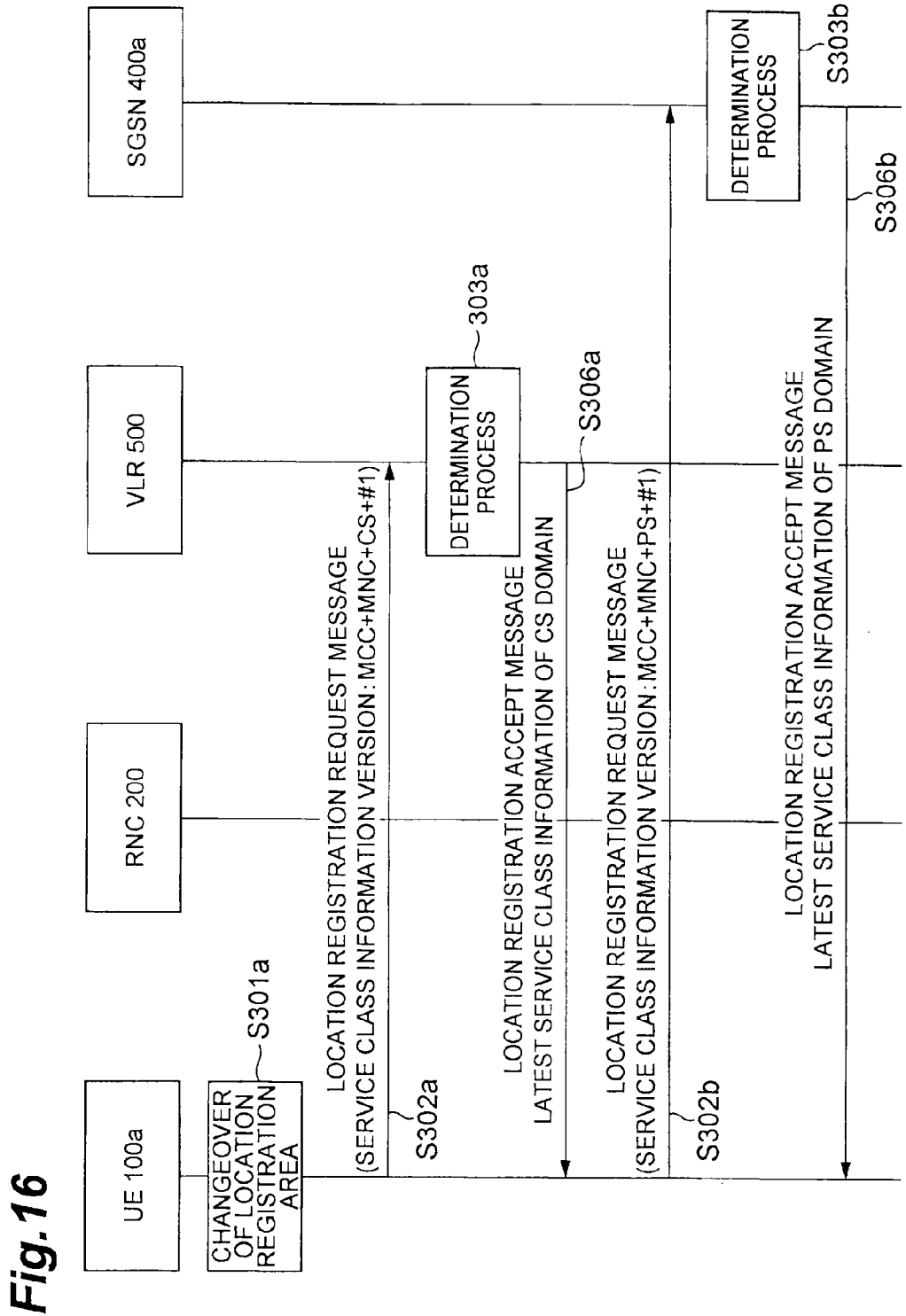

The below will describe processing upon an update of the service class information in the user equipment 100a. FIG. 16 is a sequence diagram in the update of the service class information, based on transmission of a location registration request from the user equipment 100a. Different from FIG. 9, the user equipment 100a transmits the location registration request message to each of MSC 300/VLR 500 and SGSN 400.

In the user equipment 100a, it is determined whether there was a changeover of its location registration area (S301a). When it is determined in the user equipment 100a that there was a changeover of the location registration area, the location registration request message and the service class information version (MCC+MNC+CS+#1) are sent to the MSC 300/VLR 500 (S302a). The condition for the user equipment 100a to transmit the location registration request message and service class information version can be the first activation after a subscription of the user equipment 100a or an end of a periodic location registration timer, as well as the changeover of location registration area.

When the MSC 300 receives the location registration request message, it forwards the message to the VLR 500. In the VLR 500, the location registration request receiving unit 503 receives the location registration request message and then the location registration request receiving unit 503 performs the location registration process for the user equipment 100a and determines whether the service class information version is received. When it is determined herein that the service class information version is received, the determining unit 504 determines whether the version is the latest version (S303a).

When it is determined that the version is not the latest version or when it is determined that the service class information version is not received, the notice information transmitting unit 505 adds the service class information of the latest version to the location registration accept message and the notice information transmitting unit 505 transmits the location registration accept message to the user equipment

100a (S306a). In the user equipment 100a, the notice information receiving unit 101 receives the location registration accept message, then extracts the service class information for the CS domain, based on the service class information version, and updates the service class information for the PS domain stored in the memory unit 102.

When it is determined in the user equipment 100a that there was a changeover of location registration area, the location registration request message and the service class information version are transmitted to the SGSN 400 (S302b).

In the SGSN 400, the location registration request receiving unit 403 receives the location registration request message and then the location registration request receiving unit 403 determines whether the service class information version is received. When it is determined herein that the service class information version is received, the determining unit 404 determines whether the version is the latest version (S303b).

When it is determined that the version is not the latest version or when it is determined that the service class information version is not received, the notice information transmitting unit 405 adds the service class information of the latest version to the location registration accept message and the notice information transmitting unit 405 transmits the location registration accept message to the user equipment 100a (S306b). In the user equipment 100a, the notice information receiving unit 101 receives the location registration accept message, then extracts the service class information for the PS domain, based on the service class information version, and updates the service class information for the CS domain stored in the memory unit 102.

In this manner, the update processing of service class information is carried out for each of the service class information for the PS domain and the service class information for the CS domain, based on the location registration request message.

Figure 17:
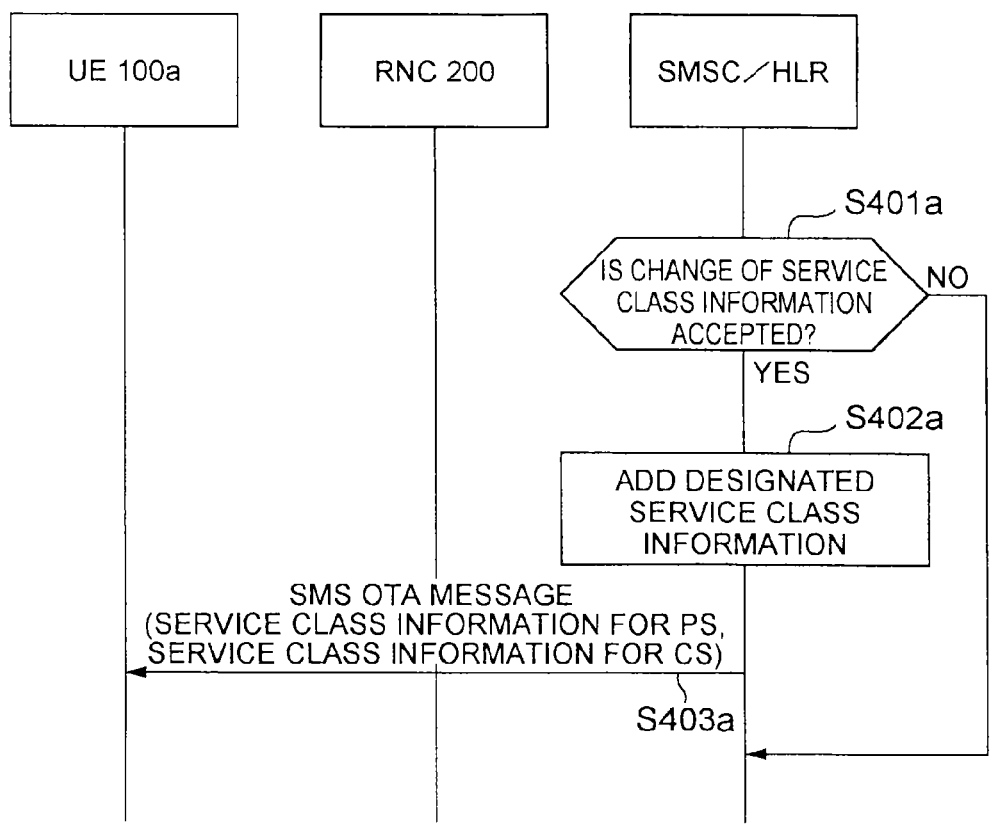
FIG. 17 is a sequence diagram showing processing upon a manual update of service class information.

The below will describe processing in manual update processing of the service class information in user equipment 100a to change restriction contents for respective users. FIG. 17 is a sequence diagram showing processing in a manual update of service class information.

An operator of SMSC/HLR determines whether the service class information version of user equipment 100a is the latest and whether a desired restriction content is effective, whereby it is determined in SMS/HLR whether a change of restriction content was accepted by a certain user (S401a). When it is determined that the change of restriction content was accepted, the service class information designated by the operator is added to an SMS OTA message. The service class information added to the SMS OTA message herein is that for the PS domain and that for the CS domain (S402a), and this SMS OTA message is transmitted to the user equipment 100 (S403a). The user equipment 100a extracts the service class information for the PS domain and the service class information for the CS domain from the received SMS OTA message and stores the information in the memory unit 102, thereby performing the update processing. The system herein is configured to transmit each of the service class information for the PS domain and the service class information for the CS domain, but it may be configured to transmit either one of them.

Figure 18:
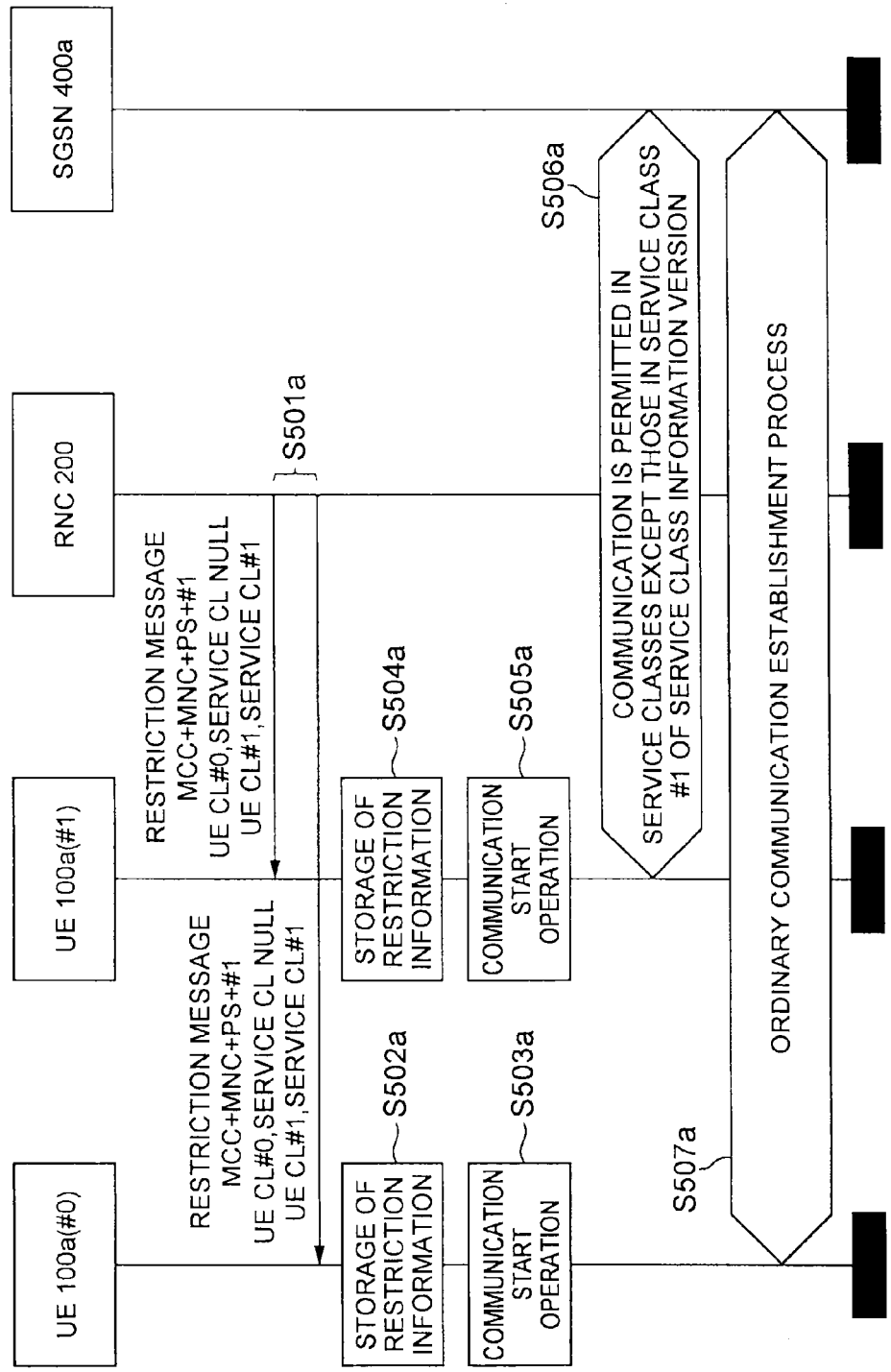
FIG. 18 is a sequence diagram showing processing upon implementation of a restriction on some user equipment 100a (UE class number #1).

The below will describe the difference of processing in each of user equipments 100a (UE class numbers #0 and #1) in a situation where there are a plurality of user equipments 100a and where the restriction instruction message is transmitted to the plurality of user equipments 100a (UE class numbers #0 and #1). FIG. 18 is a sequence diagram showing processing in imposing a restriction on only some user equipment 100a (UE class number #1).

First, the RNC 200 transmits a restriction message (broadcast information) (S501a). In this restriction message, "MCC+MNC+PS+#1" is set as the service class information version, and the restriction message includes restriction information indicative of the service class number of null for UE class number #0 and service class number #1 for UE class number #1. In this example, as shown in FIG. 13, mail is set as a restriction object in service class number #1, in correspondence to "MCC+MNC+PS+#1" being the version number for the PS domain.

The restriction information included in the restriction message is stored in the user equipment 100a (UE class number #1) (S504a). Thereafter, when the user performs a communication start operation such as web browsing which is not a restriction object (S505a), the communication processing is executed (S506a). In this case, mail is a restriction object and, therefore, when in S505a the user performs an operation to carry out mail transmission, the communication processing of S506a is not carried out and the communication processing is terminated.

The restriction information included in the restriction message is stored in the user equipment 100a (UE class number #0) (S502a). Since there is no restriction object for this user equipment 100a (UE class number #0) (i.e., since the service class number is null), when the user performs an operation to start communication (S503a), the communication establishing process is carried out without any particular restriction (S507a).

The below will describe the action and effect of the user equipment 100 (100a) used in the communication system 10 of the present embodiment and the communication system 10a of the modification example.

In the user equipment 100 (100a) in the present embodiment, the memory unit 102 stores the service class information (management information) showing the correspondence between the service classes indicative of communication services that the user equipment 100 (100a) can execute, and the service class numbers being service class codes to discriminate the service classes. Thereafter, the notice information transmitting unit 101 receives the restriction message indicative of the service class number from the RNC 200. When the restriction message including the service class number is received, the restricting unit 104 specifies the service class corresponding to the service class number stored in the memory unit 102 and makes a communication restriction in the service class effective on the communication processing unit 105. The same action is also carried out in the communication system 10a.

This allows the system to impose the communication restriction in each service class unit. The service class as a restriction object can be readily changed by such a simple transmission process that the operator to send a service class number manipulates the content of the service class number to appropriately change the service class number. Since the system uses the information with small information amount like the service class number, the information amount for broadcast can be minimized. Particularly, in the case where the restriction information is desired to be included in the broadcast information, it is effective to use the information with small information amount like the service class number.

In the user equipment 100 (100a) in the present embodiment, the notice information receiving unit 101 receives the service class information showing the correspondence between the service classes set by each operator of RNC 200 and the service class numbers and the memory unit 102 can store the received service class information. This permits the operator to determine the service classes as restriction objects corresponding to the service class numbers and can readily adapt for increase in the number of service classes. The same action and effect are also achieved in the communication system 10a.

In the user equipment 100 (100a) of the present embodiment, the notice information receiving unit 101 receives the service class information showing the correspondence between the control signal classes and the service class codes and the memory unit 102 can store the service class numbers and the control signal classes included in the received service class information, in correspondence to each other; therefore, the restriction objects are not limited only to the service classes but can also be the control signals, which permits a more appropriate restriction. The same action and effect are also achieved in the communication system 10a of the modification example.

Particularly, the embodiment using the control signals achieves the following action and effect. For example, when a location registration signal as a control signal is set as a restriction object and when a situation is such that a large number of communication terminals are located in the same area, it is feasible to prevent reduction in processing capability of switching equipment due to location registration processes simultaneously carried out by a large number of communication terminals to the same switching equipment. Furthermore, if an origination request signal being a control signal is set as a restriction object, it is feasible to prevent congestion at switching equipment and thus to prevent reduction in processing capability of the switching equipment. This switching equipment is, for example, one located in the CS domain and provided for execution of voice communication.

Furthermore, in consideration of such a tendency that in the event of a disaster the number of terminating communications increases mainly to a disaster area, it can be contemplated that an origination request signal as a control signal is set as a restriction object while a termination notice signal is excluded from the restriction objects, and that the number of termination notice signals is controlled at switching equipment so as to give priority of connection to terminating calls over originating calls, thereby enabling reduction in congestion time at the switching equipment and thus permitting optimal use of processing capability of the switching equipment.

In the user equipment 100 (100a) of the present embodiment, the notice information receiving unit 101 receives the service class information showing the correspondence between the identification information indicative of the core nodes (SGSN 400, MSC 300, VLR 500, etc.) as access restriction objects, and the service class codes, and the memory unit 102 can store the service class numbers and the identification information included in the received service class information, in correspondence to each other; therefore, the restriction objects are not limited only to the service classes but can also be set for the access to the core nodes, which permits a more appropriate restriction. The same action and effect are also achieved in the communication system 10a of the modification example.

In the user equipment 100 (100a) of the present embodiment, the memory unit 102 stores the service class information version (version information) indicative of the update state of the service class information, the communication processing unit 105 transmits the preliminarily stored service class information version to the RNC 200, and the notice information receiving unit 101 acquires the service class information corresponding to the latest version information transmitted in response to the transmission, whereby the latest service class information can be always carried out by the simple control. The same action and effect are also achieved in the communication system 10a of the modification example.

In the communication systems 10 and 10a of the present embodiment, the service class information set on the SGSN 400 side or on the VLR 500 side can be transmitted to the user equipment 100 (100a), whereby the service class information can be changed as occasion may demand.

In the communication systems 10 and 10a of the present embodiment, when the service class information is determined not to be the latest version, based on the service class information version received by the location registration request receiving unit 403, the service class information of the latest version can be transmitted, whereby the user equipment 100 (100a) can always retain the service class information of the latest version.

The invention claimed is:

1. A communication device in communication connection with a control device for performing access control, the communication device comprising:
   memory which stores management information showing correspondence between service classes indicative of communication services that the communication device can execute, and service class codes to discriminate the service classes; and
   circuitry configured to:
      receive a restriction message indicative of a service class code from the control device;
      when the circuitry receives the service class code, specify a service class corresponding to the service class code stored in the memory and implement a communication restriction in the service class; and
      receive management information showing correspondence between service classes and service class codes set by each operator of the control device,
   wherein the memory stores the management information received by the circuitry.

2. A method, implemented by a communication device in communication connection with a control device for performing access control, the method comprising:
   storing, by a memory of the communication device, management information showing correspondence between service classes indicative of communication services that the communication device can execute, and service class codes to discriminate the service classes;
   receiving a restriction message indicative of a service class code from the control device;
   when the communication device receives the service class code, specifying a service class corresponding to the service class code stored in the memory and implementing a communication restriction in the service class; and
   receiving management information showing correspondence between service classes and service class codes set by each operator of the control device,
   wherein the memory stores the management information received by the communication device.

3. A non-transitory computer readable medium that stores a program, which when executed by a communication device in communication connection with a control device for performing access control, causes the communication device to perform a method comprising:
   storing, by a memory of the communication device, management information showing correspondence between service classes indicative of communication services that the communication device can execute, and service class codes to discriminate the service classes;

receiving a restriction message indicative of a service class code from the control device;

when the communication device receives the service class code, specifying a service class corresponding to the service class code stored in the memory and implementing a communication restriction in the service class; and receiving management information showing correspondence between service classes and service class codes set by each operator of the control device, wherein the memory stores the management information received by the communication device.

\* \* \* \* \*